(12) United States Patent
Ng et al.

(10) Patent No.: US 7,123,807 B2
(45) Date of Patent: Oct. 17, 2006

(54) OPTICAL NETWORKING CIRCUIT PACK

(75) Inventors: Kwong Ng, Nepean (CA); Simon Shearman, Almonte (CA)

(73) Assignee: Nortel Networks Limited, St. Laurent (CA)

( * ) Notice: Subject to any disclaimer, the term of this patent is extended or adjusted under 35 U.S.C. 154(b) by 28 days.

(21) Appl. No.: 10/925,591

(22) Filed: Aug. 25, 2004

(65) Prior Publication Data

US 2006/0045457 A1    Mar. 2, 2006

(51) Int. Cl.
*G02B 6/00* (2006.01)
(52) U.S. Cl. .................. 385/135; 385/134; 385/137
(58) Field of Classification Search ........ 385/134–135, 385/147
See application file for complete search history.

(56) References Cited

U.S. PATENT DOCUMENTS 6,445,865 B1 *  9/2002  Janus et al. ................. 385/135
6,707,978 B1 *  3/2004  Wakileh et al. ............. 385/134
6,944,389 B1 *  9/2005  Giraud et al. ............... 385/135

OTHER PUBLICATIONS

Thorlabs, Inc., Product Catalog, vol. 15, p. 283, copyright 2002.*

* cited by examiner

*Primary Examiner*—Michelle Connelly-Cushwa
*Assistant Examiner*—James D. Stein
(74) *Attorney, Agent, or Firm*—Guerin & Rodriguez, LLP

(57) ABSTRACT

An optical networking circuit pack is described. The circuit pack houses a plurality of pluggable electronic modules and includes an enclosure panel, a plurality of module identifiers, and a fiber management assembly. The enclosure panel has at least two collinear openings to receive electronic modules. The module identifiers reside on the enclosure panel and are proximate to a respective opening. Each module identifier is oriented at an angle with respect to an edge of the enclosure panel to facilitate association of pluggable electronic module with the respective opening regardless of whether the circuit pack is oriented in a horizontal position or a vertical position. The fiber management assembly is disposed at an end of the circuit pack to facilitate routing of optical fibers.

13 Claims, 5 Drawing Sheets

OPTICAL NETWORKING CIRCUIT PACK

FIELD OF THE INVENTION

The invention relates to communications equipment. More specifically, the invention relates to a circuit pack that can be mounted horizontally or vertically in an equipment rack.

BACKGROUND OF THE INVENTION

The migration from Small Form Factor (SFF) optical devices (e.g., transceivers) to Small Form Pluggable (SFP) optical devices changes the way that optical devices are coupled to a circuit board that is housed within a circuit pack. Currently, SFF devices couple to the circuit board through a "pig-tail" connection (i.e., a length of optical fiber integral with the SFF) that is coupled to the circuit board. The pig-tail connection for each optical device is managed within the internal volume of the circuit pack. As such, openings that receive the SFF devices in the front face of the circuit pack are arranged to provide easy access to the optical devices and convenient management of the pig-tail connections within the circuit pack. Using SFP devices obviates the need for pig-tail connections by connecting to the circuit board through an interface attached directly to the circuit board.

As such, a need exists for a circuit pack for use with pluggable devices. The present invention satisfies this need and provides additional advantages.

SUMMARY OF THE INVENTION

In one aspect, the invention features a circuit pack for a communications network element. The circuit pack houses a plurality of pluggable electronic modules and includes an enclosure panel, a plurality of module identifiers, and a fiber management assembly. The enclosure panel has at least two collinear openings that each receive a respective electronic module. The module identifiers reside on the enclosure panel and are proximate to a respective one of the openings. Each module identifier is oriented at an angle with respect to an edge of the enclosure panel to facilitate association of a pluggable electronic module with the respective opening regardless of whether the circuit pack is oriented in either a horizontal position or a vertical position. The fiber management assembly is located at an end of the circuit pack In another aspect, the invention features a circuit pack for communications network element. The circuit pack houses a plurality of pluggable electronic modules. The circuit pack includes means for receiving the electronic modules in a linear arrangement, means for identifying the means for receiving, and means for routing fibers. The means for identifying is oriented an angle relative to an edge of the circuit pack to facilitate association of the pluggable electronic modules with a respective one of the means for receiving when the circuit pack is orientated in either a horizontal position or a vertical position. The means for routing fibers is coupled to the circuit pack at an end of the circuit pack.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

As a general overview, the invention relates to a circuit pack for use with pluggable optical electronic modules. Examples of pluggable optical modules include, but are not limited to, Small Form Factor Pluggable (SFP) optical transceivers and Dense Wavelength Division Multiplexing (DWDM) Pluggable devices. The front face of the circuit pack features a plurality of collinear openings that receive the pluggable modules and allow the modules to interface with a means to couple the modules to a circuit board within the circuit pack. Each opening includes a module identifier that associates (e.g., indicates) the opening for a particular module. Advantageously, the module identifier is readable by personnel regardless of the mounting orientation of the circuit pack.

As the size of the electronic modules continues to decrease, a greater number of modules can be included in each circuit pack. Consequently, more fiber connections are provided on the front face of the circuit pack. To manage the routing of the optical fibers, a fiber management assembly is provided at each end of the circuit pack.

Figure 1:
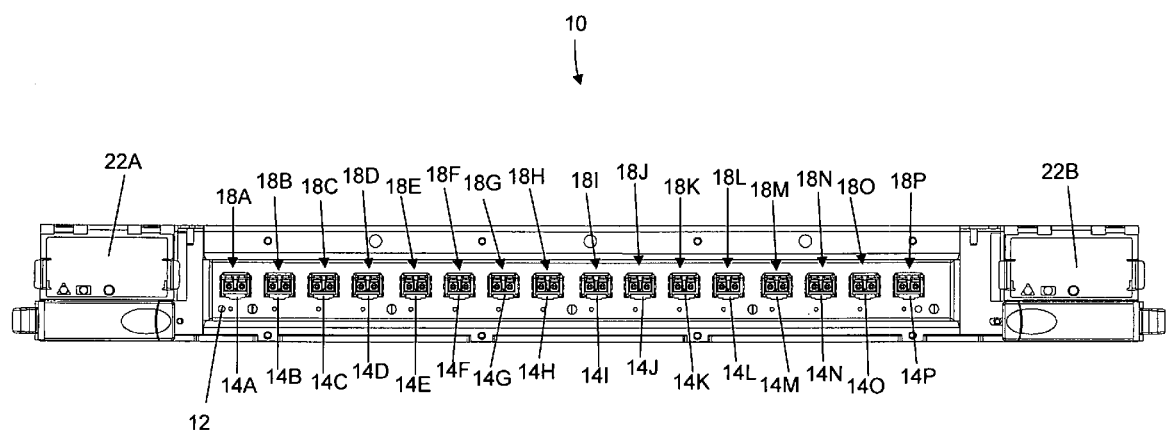
FIG. 1 is a front view of an embodiment of a circuit pack constructed according to the principles of the invention.

FIG. 1 depicts a front view of an embodiment of a circuit pack 10 constructed according to the principles of the invention. The circuit pack 10 includes an enclosure panel 12 (i.e., front panel) having a plurality of SFP modules 14A, 14B, 14C, . . . , 14P (referred to generally as module 14) disposed in a respective opening 18A, 18B, 18C, . . . , 18P (referred to generally as opening 18). The openings 18 are arranged linearly and equidistant from the circuit board to facilitate the connection of the modules 14 to the circuit board (not shown) within the circuit pack 10. A connector cage (not shown) that is mounted on the circuit board receives the pluggable modules 14 and couples the modules 14 to the circuit board within the circuit pack 10. As shown, the circuit pack 10 houses sixteen modules 14. However, it should be understood that the circuit pack can house fewer or additional modules 14 in one or more rows of openings 18.

At opposite ends of the circuit pack 10 are a first fiber management apparatus 22A and a second fiber management apparatus 22B. In one embodiment, each fiber management apparatus 22A, 22B is the fiber management apparatus described in co-pending patent application Ser. No. 10/787,778 filed on Feb. 26, 2004, the contents of which are incorporated by reference herein in their entirety. Each fiber management apparatus 22A, 22B provides a means to maintain the bend radius of the fibers that couple to the modules 14. Using two fiber management apparatuses 22A, 22B allows routing of more fibers to the modules 14 than is otherwise possible with only a single fiber management apparatus 22. Moreover, two fiber management apparatuses 22A, 22B permit more convenient routing of fibers when mounting the circuit pack 10 in a vertical position.

Figure 2:
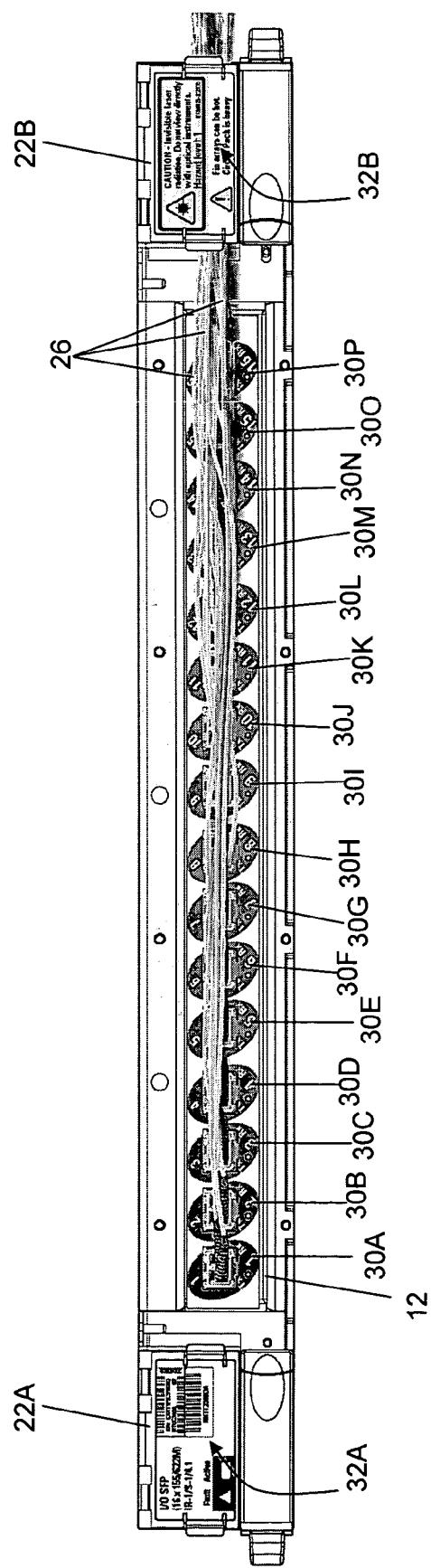
FIG. 2 is a front view of embodiment of a circuit pack constructed according to the principles of the invention.

FIG. 2 shows a plurality of optical fibers 26 coupled to the modules 14. In order to correctly determine which fiber 26 is associated with a particular module 14, the enclosure panel 12 includes a plurality of module identifiers 30A, 30B, 30C, . . . , 30P (referred to generally as module identifier 30). Each of the module identifiers 30 is located proximate to a respective opening 18 in the enclosure panel 12. As shown, the module identifiers 30 include alphanumeric markings to associate the module 14 with the opening 18. Unlike identification provided on the enclosure panels of typical circuit packs, the module identifiers 30 are oriented at angle relative to an edge of the enclosure panel 12. The angular orientation facilitates identification of the respective module 14 whether the circuit pack 10 is installed horizontally (as shown) or vertically.

Each fiber management apparatus 22A, 22B includes label 32A, 32B (e.g., stickers or laser etching). The labels 32A, 32B provide various warnings, instructions, and/or circuit pack identification markings. One label 32A includes markings that identify the type of circuit pack 10. The markings can include inventory tracking identifiers such as bar codes, serial numbers, and other additional circuit pack identification criteria like operating environment parameters. The other label 32B includes markings similar in nature to those of the first fiber management apparatus 22A.

Figure 3:
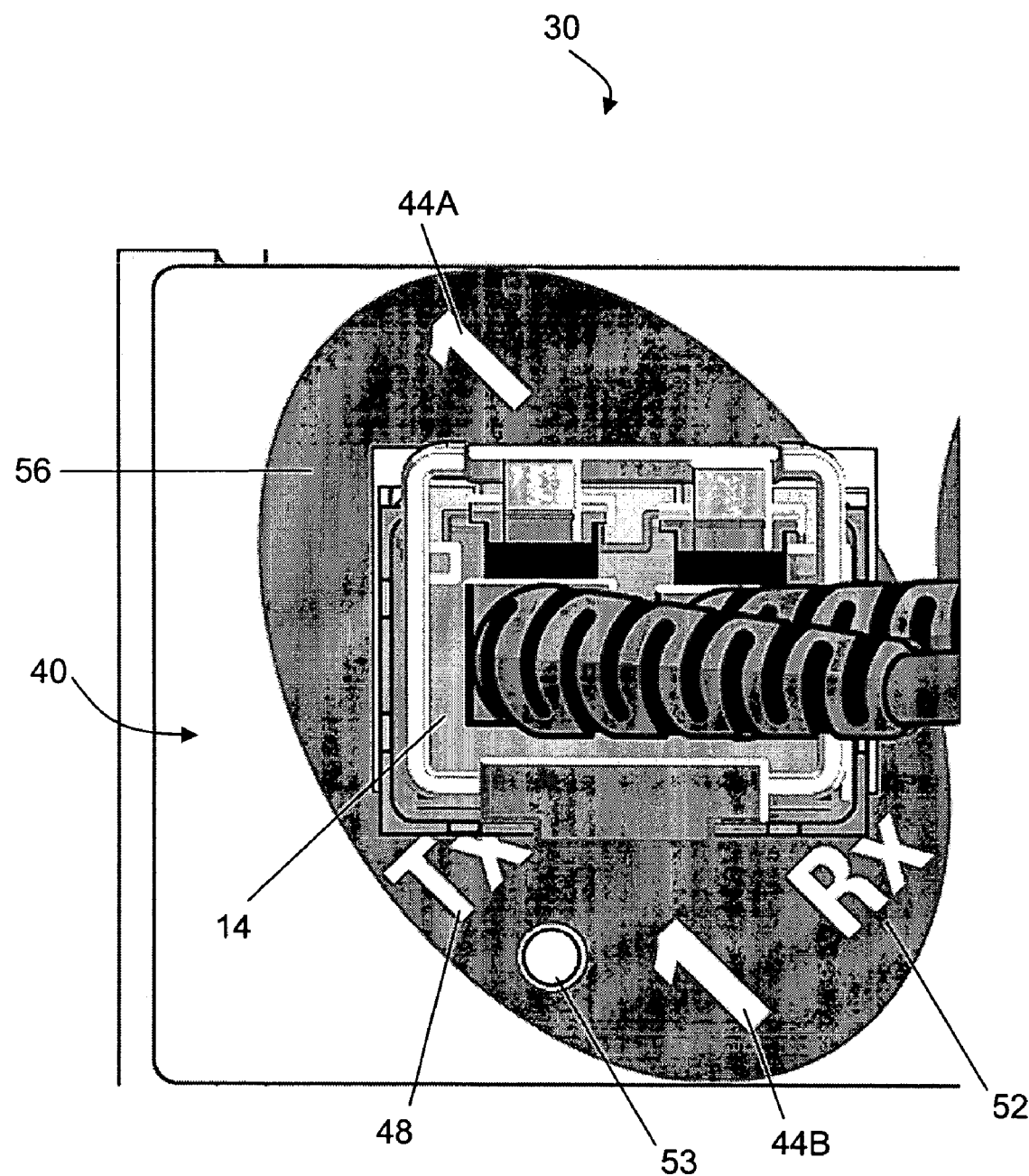
FIG. 3 is a detailed view of the module identifier of the circuit pack of FIG. 2.

FIG. 3 shows details of one of the module identifiers 30 of FIG. 2. In one embodiment, the module identifier 30 includes a plurality of markings to aid in the identification of the module 14. The markings include a pair of identification numbers 44A, 44B, a transmit port identifier (e.g., Tx) 48, and a receive port identifier (e.g., Rx) 52 that are all surrounded by a background 56. A loss-of-signal illumination device 53 is also surrounded by the background 56. The markings and background 56 are oriented at a 45° angle with respect to an edge of the enclosure panel 12 to facilitate identification of the module 14 when the circuit pack 10 is horizontally or vertically mounted. The shape of the background 56 can vary depending on the dimensions of the circuit pack 10, the spacing between the modules 14, and the dimensions of the modules 14. In one embodiment, the background is oval shaped. The color of the background 56 differs from the color of the pair of numbers 44A, 44B, the transmit port identifier 48, and the receive port identifier 52 for contrast. In one embodiment, the background 56 is a darker color and the numbers 44A, 44B, the transmit identifier 48, and the receive port identifier 52 are white alphanumeric characters.

Figure 4:
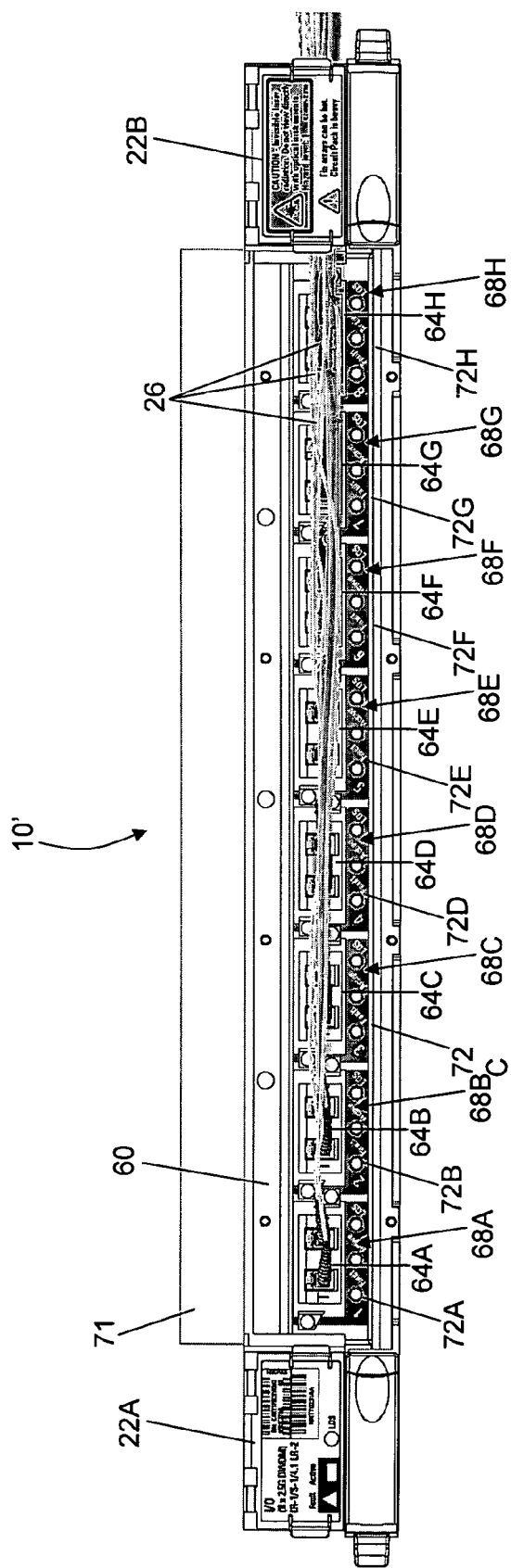
FIG. 4 is a front view of an embodiment of a circuit pack constructed according to the principles of the invention.

FIG. 4 shows another embodiment of a circuit pack 10' constructed according to the principles of the invention. The circuit pack 10' includes an enclosure panel 60 (i.e., front panel) having a plurality of DWDM modules 64A, 64B, 64C, . . . , 64H (referred to generally as DWDM module 64) disposed in a respective opening 68A, 68B, 68C, . . . , 68H (referred to generally as opening 68). The openings 68 are collinear to facilitate connection of the DWDM modules 64 to the circuit board (not shown) within the circuit pack 10'.

Each one of the plurality of optical fibers 26 couples to a respective DWDM pluggable module 64. A cover 71 protects the fibers 26 and the modules 64 when the cover 71 is in a closed position so that the fibers are not disturbed by accidental touching. The cover 71 is rotatably connected to the circuit pack 10'. The cover 71 is constructed of a transparent plastic material or other transparent material (e.g., perforated sheet metal or mesh) to allow a technician to view the enclosure panel 60 when the cover 71 is in a closed position.

Similar to circuit pack of FIG. 2, the enclosure panel 60 includes a plurality of module identifiers 72A, 72B, 72C, . . . , 72H (referred to generally as module identifier 72). Each of the module identifiers 72 is located proximate to a respective opening 68 in the enclosure panel 60. As shown, the module 72 identifiers include a respective set of markings 76A, 76B, 76C, . . . , 76H (referred to generally as markings 76) that associate the module 64 with the opening 68.

A plurality of illuminations devices (e.g., light emitting diodes) 70, 70', 70" is associated with each opening 68 of the circuit pack 10'. The illumination devices 70, 70', 70" indicate various operational states of the respective DWDM module 64. The markings 74 of the module identifier 72 include alphanumeric characters (e.g., a label) that distinguish among the operational states of the DWDM module 64. In addition, each of the illuminations devices 70, 70', 70" can emit light of a different color to better enable an observer to determine the operating state of the module 64.

Figure 5:
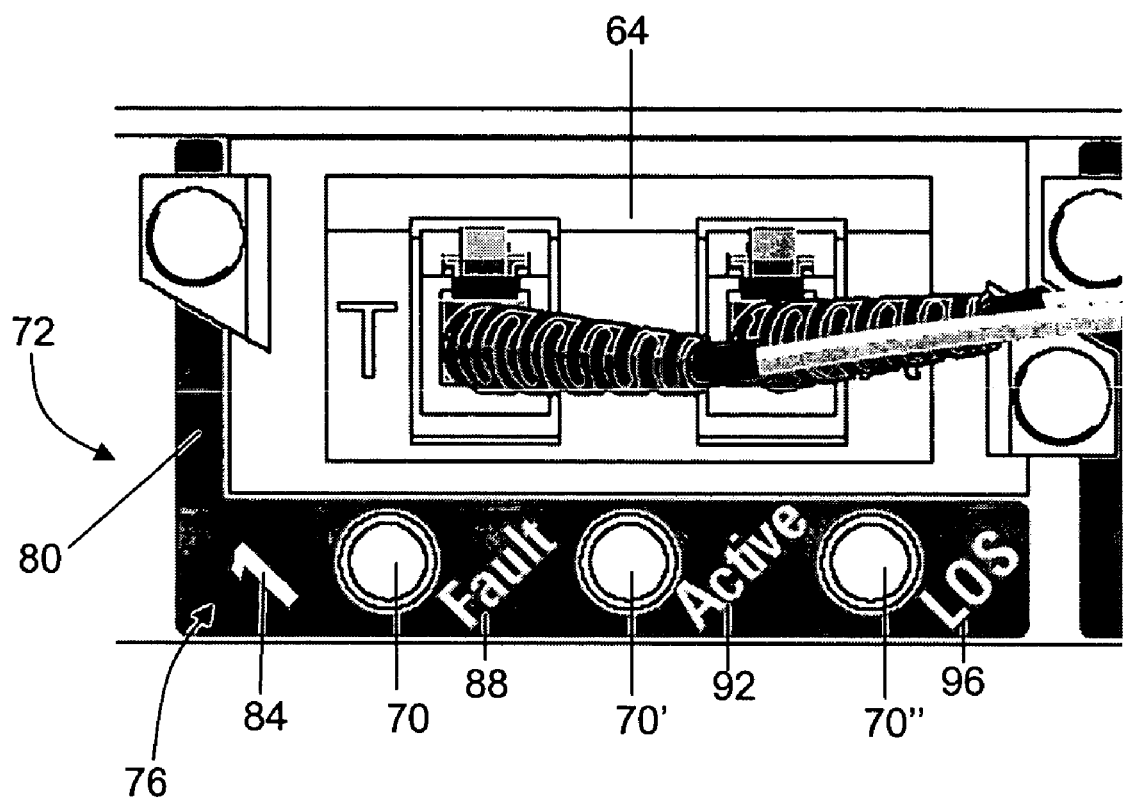
FIG. 5 is a detailed view of the module identifier of the circuit pack of FIG. 5.

FIG. 5 shows a module identifier 72 of FIG. 4 in more detail. The module identifier 72 includes a background 80 that surrounds the markings 76. In one embodiment, the markings 76 include a number 84, an operational fault label 88, a service active label 92, and a loss-of-signal label 96. Similar to the module identifier 30 of FIG. 3, each of the markings 76 is oriented at a 45° angle with respect to an edge of the enclosure panel 60. The number 84 allows for identification of the opening 68 of the panel 60.

Each of the operational fault label 88, the active label 92, and the loss-of-signal label 96 is associated with an illumination device 70 to provide information regarding the operational state of the respective module 64. The operational fault label 88 is associated with the illumination device 70. In one embodiment, the illumination device 70 is a red LED that emits light when the DWDM module 64 is in a fault state. The active label 92 is associated with the illumination device 70'. In one embodiment, the illumination device 70' is a green LED that emits light when the DWDM module 64 is operating normally. The loss-of-signal label 96 is associated with the illumination device 70". In one embodiment, the illumination device 70" is an orange LED that emits light when a communications signal is not received by the DWDM module 64.

While the invention has been shown and described with reference to specific preferred embodiments, it should be understood by those skilled in the art that various changes in form and detail may be made therein without departing from the spirit and scope of the invention as defined by the following claims.

What is claimed is:

1. A circuit pack for a communications network clement having a plurality of pluggable electronic modules comprising:

an enclosure panel having a plurality of substantially collinear openings to receive a respective one of the electronic modules;

a plurality of module identifiers disposed on the enclosure panel each proximate to a respective one of the openings, each of the module identifiers oriented at an angle with respect to an edge of the enclosure panel to facilitate association of one of the pluggable electronic modules with a respective opening regardless of whether the circuit pack is oriented in a horizontal position or a vertical position; and a fiber management assembly located at an end of the circuit pack.

2. The circuit pack of claim 1 wherein the angle is substantially 45 degrees.

3. The circuit pack of claim 1 further comprising a plurality of illumination elements associated with each one of the openings.

4. The circuit pack of claim 3 farther comprising a label associated with each one of the illumination elements, the label oriented at substantially the same angle as the respective module identifier.

5. The circuit pack of claim 1 further comprising a transparent cover rotatably attached to the circuit pack, the transparent cover protecting an optical fiber coupled to one of the pluggable electronic modules when then transparent cover is in a closed position.

6. The circuit pack of claim 1 further comprising a fiber management assembly located at an opposite end of the circuit pack.

7. A circuit pack for a communication network element having a plurality of pluggable electronic modifies comprising:
    an enclosure panel having a plurality of substantially collinear openings to each receive a respective one of the pluggable electronic modules;
    an alphanumeric marking disposed on the enclosure panel proximate to each of the openings, the alphanumeric marking oriented at a substantially 45 degree angle with respect to an edge of the enclosure panel to facilitate association of each pluggable electronic module with a respective opening regardless of whether the circuit pack is orientated in a horizontal position or a vertical position;
    a first fiber management assembly located at an end of the circuit pack;
    a second fiber management assembly located at an opposite end of the circuit pack; and
    a transparent cover rotatably attached to the circuit pack, the transparent cover protecting an optical fiber coupled to one of the pluggable electronic modules when the transparent cover is in a closed position.

8. A circuit pack for communications network element having a plurality of pluggable electronic modules comprising:
    means for receiving the electronic modules in a linear arrangement;
    means for identifying the means for receiving, the means for identifying oriented an angle relative to an edge of the circuit pack, the means for identifying facilitating association of the pluggable electronic modules with a respective one of the means for receiving regardless of whether the circuit pack is orientated in a horizontal position or a vertical position; and
    a means for routing optical fibers coupled to the circuit pack, the means for routing being located at an end of the circuit pack.

9. The circuit pack of claim 8 further comprising a second means for routing optical fibers coupled to the electronic modules at an opposite end of the circuit pack.

10. The circuit pack of claim 8 furthers comprising transparent means for protecting an optical fiber coupled to one of the plurality of electronic modules.

11. The circuit pack of claim 8 wherein the angle is substantially 45 degrees.

12. The circuit pack of claim 8 further comprising a plurality of illumination means for indicating the status of a respective one of the electronic modules, the plurality of illumination means associated with each one of the plurality of means for receiving.

13. The circuit pack of claim 12 further comprising a label associated with each one of the plurality of illumination means and oriented at substantially the same angle as the means for identifying.

* * * * *